United States Patent Office 2,697,705
Patented Dec. 21, 1954

2,697,705

ADDUCTS OF 12-HYDROXY-5,7,9(11)-PREGNATRIEN-20-ONES

Robert H. Levin, Kalamazoo Township, Kalamazoo County, A Vern McIntosh, Jr., Kalamazoo, and George B. Spero, Kalamazoo Township, Kalamazoo County, Mich., assignors to The Upjohn Company, Kalamazoo, Mich., a corporation of Michigan No Drawing. Application May 22, 1953,
Serial No. 356,893

9 Claims. (Cl. 260—239.55)

The present invention relates to adducts of 12-hydroxy-5,7,9(11)-pregnatrien-20-ones with certain acids, anhydrides, imides and esters of $\alpha,\beta$-unsaturated dicarboxylic acids, particularly with maleic anhydride, maleimide and esters of maleic acids, and to processes for their production.

This application is a continuation-in-part of our copending application Serial No. 184,702, filed September 13, 1950, now U. S. Patent 2,623,043, issued December 23, 1952, and of our copending application Serial No. 228,132, filed May 24, 1951, now abandoned, to which reference is made also for the preparation of the starting compounds referred to in this specification.

The adducts of 12-hydroxy-5,7,9(11)-pregnatrien-20-ones which are the preferred embodiment of this invention are represented by the following formula:

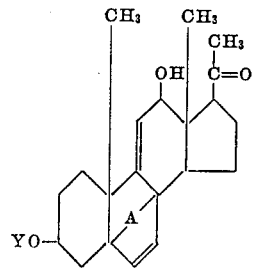

in which the Y in the 3 position of the steroid nucleus is hydrogen or an acyl radical of an organic carboxylic acid, especially those aliphatic hydrocarbon carboxylic acids containing from one to eight carbon atoms, inclusive, per molecule, and A is the adduct radical of an $\alpha,\beta$-unsaturated carbonyl compound of the group consisting of maleic acid, maleic anhydride, maleimide and dialkyl maleates containing from one to eight carbon atoms, inclusive, in each alkyl radical.

The principal object of the present invention is to provide novel compounds which are useful in the preparation of steroid compounds containing an oxygen atom attached to carbon atom eleven of the steroid nucleus. Another object of the present invention is to provide a process for the production of these new compounds. Other objects and advantages of the invention, some of which are referred to hereinafter, will be apparent to those skilled in the art to which the invention pertains.

The compounds of the present invention are useful in the preparation of physiologically active steroid compounds which possess an oxygen atom in position 11 or 12. For example, heating a 3$\beta$-acyloxy-12-hydroxy-5,7,9(11) - pregnatrien - 20 - one or 3$\beta$,12 - dihydroxy-5,7,9(11)-pregnatrien-20-one with an amine as described by Levin et al. in U. S. Patent 2,577,776 issued December 11, 1951, removes the adduct group yielding a 3$\beta$-acyloxy-12-hydroxy-5,7,9(11)-pregnatrien-20-one or 3$\beta$,12-dihydroxy-5,7,9(11)-pregnatrien-20-one, which may be hydrogenated to give 3$\beta$-acyloxy-12-hydroxypregnan-20-one or 3$\beta$,12-dihydroxypregnan-20-one. Hydrolysis of 3$\beta$-acyloxy-12-hydroxypregnan-20-one with sodium hydroxide and oxidation of the thus-obtained 3$\beta$,12-dihydroxypregnan-20-one with chromic acid results in the known pregnane-3,12,20-trione [Selye, Encyclopendia of Endocrinology, section I, volume IV, 1943, A. W. T. Franks Publishing Company, Montreal, page 603; Hoehn and Mason, J. Am. Chem. Soc. 60, 1702 (1938); Reichstein et al., Helv. Chim. Acta 23, 747 (1940)] which has anesthetic and luteoid properties (Selye reference). When pregnane-3,12,20-trione is reacted with sodium borohydride, the 3-keto and 12-keto groups are reduced. Treatment of the thus-obtained 3$\alpha$,12-dihydroxypregnan-20-one with acetic anhydride yields the 3$\alpha$-acetate and oxidation of this compound with chromic acid produces 3$\alpha$-acetoxypregnane-12,20-dione which was converted by Gallagher (U. S. Patent 2,447,325, columns 1 and 2) into 3$\alpha$-hydroxypregnane-11,20-dione, which can be converted to cortisone by the method of Kritchevsky, Garmaise and Gallagher, J. Am. Chem. Soc. 74, 483 (1952).

Compounds of the present invention which are of particular interest are those compounds conforming to the foregoing general formula and in which YO represents hydroxyl or an acyloxy radical resulting from the esterification of the hydroxyl group of the steroid with a carboxylic acid containing up to and including eight carbon atoms. Such acids include formic, acetic, propionic, butyric, valeric, hexanoic, heptanoic, octanoic, succinic, glutaric, cyclopentanoic, cyclohexanoic, benzoic, toluic, and the like; the lower aliphatic acids of this group are preferred embodiments of the invention. The acids may contain substituents, such as halogen, alkyl and methoxy radicals which are non-reactive with the reagents used in the methods described herein for the preparation of the compounds of the invention. The adduct bridge (—A—) that is represented between the 5 and 8 positions of the steroid nucleus of these compounds may be represented by the graphic formulae:

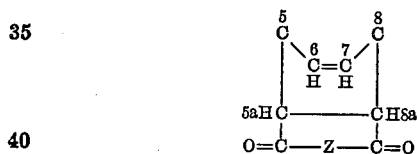

and

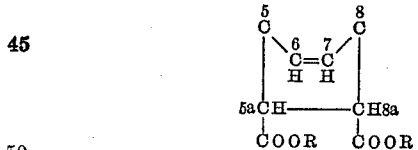

the first of which represents that derived from maleic anhydride and maleimide (in which Z represents an oxygen (—O—) or an imido (—NH—) radical) while the second represents that derived from maleic acid and its esters. In this second formula R represents hydrogen or an alkyl radical. Such alkyl radicals (R) include the methyl, ethyl, propyl, isopropyl, butyl, isobutyl, lauryl, heptyl, octyl, cyclopentyl, cyclohexyl, benzyl and similar radicals, which may contain substituents such as halogen, methoxy and hydroxyl radicals, which are non-reactive with the reagents used in the methods described herein for their preparation. While adducts of esters of maleic acids are described herein with particular reference to those of dimethyl maleate, the preferred embodiment of R in the foregoing second formula is a lower-alkyl radical containing from one to eight carbon atoms, inclusive.

The compounds of the present invention are usually colorless crystalline solids. Those which are adducts formed from $\alpha,\beta$-unsaturated acids and anhydrides are readily convertible to diester adducts by esterification with reagents such as diazoalkanes in accordance with the method described by Wilds et al. in J. Org. Chem. 13, 763 (1948). The adducts of dicarboxylic acids may be converted to adducts of the corresponding dicarboxylic acid anhydrides by heat. The adducts of acid anhydrides may be converted to those of the corresponding acid by hydration with water.

The starting compounds from which the compounds of the present invention are prepared are adducts of 3$\beta$-(hydroxy or acyloxy)-12-(bromo or acyloxy)-5,7,9(11)- pregnatrien-20-ones with maleic anhydride and its equivalents, having the general formula:

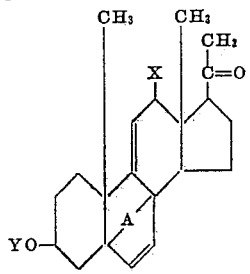

in which A and Y have the significance hereinbefore specified and X is bromine or an acyloxy radical which results from the esterification of the 12-hydroxyl group of the steroid with a carboxylic acid containing up to and including eight carbon atoms, the same as the acyl radicals included in the designation YO. The preparation of these compounds, which is described in detail in our copending application Serial No. 184,702, filed September 13, 1950, now U. S. Patent 2,623,043, issued December 23, 1952, and in our copending application Serial No. 228,131, filed May 24, 1951, now abandoned, consists essentially of the following (alternative procedures are also described in our said copending application):

(1) Dehydroergosterol is converted to an adduct with maleic anhydride or the desired equivalent of maleic anhydride [H. Honigmann, Annalen 308, 89–98 (1934)].

(2) The adduct of dehydroergosterol is esterified by reaction, for example, with benzoyl chloride, acetyl chloride or formic acid.

(3) The resulting adduct of the 3β-acyloxydehydroergosterol is ozonized and then reduced in acid solution with zinc dust to obtain a 3β-acyloxybisnor-5,7,9(11)-cholatrien-22-al. (See application of Robert H. Levin, Serial No. 111,100, filed August 18, 1949, now U. S. Patent 2,620,337, issued December 2, 1952, for details).

(4) An enol ester of the resulting 3β-acyloxybisnor-5,7,9(11)-cholatrien-22-al is prepared and ozonized to the adduct of a 3β-acyloxy-5,7,9(11)-pregnatrien-20-one.

(5) The resulting adduct of the 3β-acyloxy-5,7,9(11)-pregnatrien-20-one is reacted with N-bromosuccinimide or bromine to produce an adduct of a 3β-acyloxy-12-bromo-5,7,9(11)-pregnatrien-20-one.

(6) From the adduct of the 3β-acyloxy-12-bromo-5,7,9(11)-pregnatrien-20-one, the adduct of the 3β,12-diacyloxy-5,7,9(11)-pregnatrien-20-one, if this compound rather than the 12-bromo steroid adduct is desired as the starting compound, can be prepared by reaction of the 12-bromo steroid adduct with a metal salt of an esterifying acid or with an esterifying acid and zinc metal, as described in our copending application Serial No. 228,131, filed May 24, 1951, now abandoned, and in Preparations 1 and 2 hereinafter.

In accordance with one of the processes of our invention, the adducts of 12-bromo-3β-(hydroxy or acyloxy)-5,7,9(11)-pregnatrien-20-ones are converted to the desired 12-hydroxy-3β-(hydroxy or acyloxy)-pregnatrien-20-one by reaction with silver nitrate. The 12-bromo steroid adduct is dissolved in an organic solvent, for example, acetone, dioxane, or the like, and the silver nitrate in aqueous solution is added thereto with stirring. Temperatures of from approximately zero to approximately fifty degrees centigrade are suitable, with room temperatures being preferred. At the end of the reaction period, usually about one hour, the precipitated silver bromide is removed by filtration and the 12-hydroxy-3(hydroxy or acyloxy)-5,7,9(11)-pregnatrien-20-one adduct is precipitated by addition of water. The product may be recrystallized from an organic solvent to yield a more highly purified product, if desired. This process is illustrated in Examples 1 and 2 hereinafter.

In accordance with another of the processes of our invention, the adducts of 12-acyloxy-3β-(hydroxy or acyloxy)-5,7,9(11)-pregnatrien-20-ones are converted to the desired 3β,12-dihydroxy-5,7,9(11)-pregnatrien-20-one by saponification with a base. Such processes are illustrated in Examples 3, 5, and 6 hereinafter. In such processes, the adduct, if it is an anhydride or ester adduct, is generally hydrolyzed to the acid adduct; the acid adduct may be restored to the anhydride adduct by heating at a subatmospheric pressure, as illustrated in Example 7 hereinafter. The hydrolysis of the monoacyloxy (12-acyloxy) steroids is generally effected with approximately three molecular equivalents of sodium hydroxide or other base whereas approximately four molecular equivalents are required for the hydrolysis of the diacyloxy (3,12-diacyloxy) steroids specified herein. The hydrolysis is preferably conducted in an organic solvent such as dioxane, methanol, and the like, and the product can be recovered by concentration of the solution, acidification with dilute hydrochloric or other acid and filtration, or by extraction of the aqueous reaction mixture with ether or other water-immiscible solvent.

Typical processes for producing typical compounds of this invention are described in the examples which follow. It is to be understood that these are merely illustrative and are not to be construed as limiting.

*Example 1.—Maleic anhydride adduct of 3β-acetoxy-12-hydroxy-5,7,9(11)-pregnatrien-20-one*

To a solution of 1.5 grams of the maleic anhydride adduct of 3β-acetoxy-12-bromo-5,7,9(11)-pregnatrien-20-one (melting point, 216–218 degrees centigrade; prepared as described in our copending application Serial No. 184,702, now U. S. Patent 2,623,043, issued December 23, 1952) in 150 milliliters of acetone was added sixty milliliters of 0.1-normal silver nitrate solution. The addition was made portion-wise with shaking. After one hour at room temperature, the silver bromide which formed was removed by filtration and the filtrate diluted with water until crystallization began. The product, filtered after cooling, was 1.2 grams of 3β-acetoxy-12-hydroxy-5,7,9(11)-pregnatrien-20-one maleic anhydride adduct, melting point 225–234 degrees centigrade. A sample recrystallized for analysis melted at 234–237 degrees centigrade. $[\alpha]_D^{25}$ plus 126.6 degrees (chloroform).

*Analysis.*—Calculated for $C_{27}H_{32}O_7$: C, 69.21; H, 6.89. Found: C, 69.84; H, 7.02.

*Example 2.—Dimethyl maleate adduct of 3β-acetoxy-12-hydroxy-5,7,9(11)-pregnatrien-20-one*

Similarly, by the method of Example 1, the corresponding 12-bromo dimethyl maleate adduct (melting point, 207.5–211 degrees centigrade; prepared as described in our copending application Serial No. 184,702, now U. S. Patent 2,623,043, issued December 23, 1952) hereinbefore was converted to 3β-acetoxy-12-hydroxy-5,7,9(11)-pregnatrien-20-one dimethyl maleate adduct, melting point 205–214 degrees centigrade. $[\alpha]_D^{25}$ plus at 139.6 degrees (chloroform).

*Analysis.*—Calculated for $C_{29}H_{38}O_8$: C, 67.68; H, 7.44. Found:: C, 67.70; H, 7.48.

PREPARATION 1.—MALEIC ANHYDRIDE ADDUCT OF 3β,12-DIACETOXY-5,7,9(11)-PREGNATRIEN-20-ONE

One half (0.5) gram of the maleic anhydride adduct of 3β - acetoxy - 12 - bromo - 5,7,9(11) - pregnatrien - 20-one (melting point, 216–218 degrees centigrade; prepared as described in our copending application Serial No. 184,702), 0.5 gram of sodium acetate (dried for one hour at 100 degrees centigrade), and 25 milliliters of acetic acid were mixed and heated at reflux for one hour. The acetic acid was removed in vacuo and the residue taken up in methylene chloride and water. The methylene chloride layer was separated, washed with water and dried. Twenty-five (25) milliliters of isopropyl ether was added and the solution concentrated until all of the methylene chloride was removed. Upon cooling, 0.27 gram of 3β,12-diacetoxy-5,7,9(11)-pregnatrien-20-one maleic anhydride adduct, melting point 232-245 degrees centigrade, crystallized; the crystals were filtered from the solution. Several recrystallizations from acetone-water raised the melting point to 248–250 degrees centigrade. $[\alpha]_D^{25}$ plus 256 degrees (chloroform).

*Analysis.*—Calculated for $C_{29}H_{34}O_6$: C, 68.21; H, 6.71. Found: C, 67.65; H, 6.55.

PREPARATION 2.—DIMETHYL MALEATE ADDUCT OF 3β,12-DIACETOXY-5,7,9(11)-PREGNATRIEN-20-ONE

A solution of 2.7 grams of the dimethyl maleate adduct of 3β-acetoxy-12-bromo-5,7,9(11)-pregnatrien - 20 - one (melting point, 207.5–211 degrees centigrade; prepared as described in our copending application Serial No. 184,702, now U. S. Patent 2,623,043, issued December 23, 1952) in 100 milliliters of acetic acid was warmed on the steam bath. Ten (10) grams of zinc dust was then added portionwise to the warm solution over a period of ten minutes and the mixture was heated for an additional hour. The zinc dust was removed by filtration while the mixture was still hot and the filtrate diluted with one liter of water. The product, 3β,12-diacetoxy-5,7,9(11)-pregnatrien-20-one dimethyl maleate adduct, precipitated and was collected by filtration. The yield was 1.98 grams; its melting point was 202–210 degrees centigrade, but it was raised on recrystallization to 216–218 degrees centigrade. $[\alpha]_D^{25.5}$ plus 270.42 degrees (chloroform).

*Analysis.*—Calculated for $C_{31}H_{42}O_8$: C, 66.64; H, 7.58; $CH_3CO$, 15.41. Found: C, 66.57; H, 7.25; $CH_3CO$, 15.16.

The same compound was obtained by treating 3β,12-diacetoxy-5,7,9(11)-pregnatrien-20-one maleic anhydride adduct (Preparation 1) with diazomethane.

*Example 3.—Maleic acid adduct of 3β,12-dihydroxy-5,7,9(11)-pregnatrien-20-one*

To a solution of 1.0 gram of the dimethyl maleate adduct of 3,12-diacetoxy-5,7,9(11)-pregnatrien-20-one in 45 milliliters of dioxane was added an aqueous solution of 2.5 grams of sodium hydroxide and the mixture was allowed to stand at room temperature for one hour. Twenty (20) milliliters of water was then added and the mixture was allowed to stand an additional forty minutes. The reaction product was drowned out with water, extracted with ether and the ether extract washed, dried and evaporated to dryness. This yielded 426 milligrams of the maleic acid adduct of 3β,12-dihydroxy-5,7,9(11)-pregnatrien-20-one, which was not crystallized.

*Example 4.—Dimethyl maleate adduct of 3β,12-dihydroxy-5,7,9(11)-pregnatrien-20-one*

The maleic acid adduct of 3,12-dihydroxy-5,7,9(11)-pregnatrien-20-one obtained in Example 3 (0.426 gram) was dissolved in forty milliliters of a mixture of ether and methylene chloride (5:3) and the solution was cooled in an ice bath. Ten (10) milliliters of a solution of diazomethane in methylene chloride (equivalent to a stoichiometric excess of diazomethane) was added and the mixture was allowed to stand in the cold for thirty minutes and at room temperature for thirty minutes. The solution was then evaporated to dryness and the residue was purified by chromatography over alumina. The fraction eluted from the chromatogram with benzene-methanol (96:4) was crystallized from acetone-isopropyl ether and gave the dimethyl maleate adduct of 3β,12-dihydroxy-5,7,9(11)-pregnatrien-20-one, melting point 207–210 degrees centigrade. One recrystallization from the same solvent raised its melting point to 209–211 degrees centigrade.

*Analysis.*—Calculated for $C_{27}H_{36}O_7$: C, 68.62; H, 7.68. Found: C, 68.67; H, 7.67.

*Example 5.—Maleic acid and dimethyl maleate adducts of 3β,12-dihydroxy-5,7,9(11)-pregnatrien-20-one*

The dimethyl maleate adduct of 3β,12-dihydroxy-5,7,9(11)-pregnatrien-20-one is also obtained when the maleic anhydride adduct of 3β,12-diacetoxy-5,7,9(11)-pregnatrien-20-one (Preparation 1, melting point 248–250 degrees centigrade) is treated with sodium hydroxide as in Example 3 and the resulting maleic acid adduct is esterified with diazomethane as in Example 4.

*Example 6.—Dimethyl maleate adduct of 3β,12-dihydroxy-5,7,9(11)-pregnatrien-20-one*

The dimethyl maleate adduct of 3β,12-dihydroxy-5,7,9(11)-pregnatrien-20-one is also obtained when the dimethyl maleate adduct of 3-acetoxy-12-hydroxy-5,7,9-(11)-pregnatrien-20-one (Example 2, melting point 205–214 degrees centigrade) is hydrolyzed in a similar manner with sodium hydroxide and reesterified with diazomethane as in Example 4.

*Example 7.—Conversion of the maleic acid to the maleic anhydride adduct of 3β,12-dihydroxy-5,7,9(11)-pregnatrien-20-one*

When the maleic acid adduct of 3β,12-dihydroxy-5,7,9(11)-pregnatrien-20-one (Example 3) is heated for ten hours at 140 degrees centigrade at subatmospheric pressure the maleic anhydride adduct of 3β,12-dihydroxy-5,7,9(11)-pregnatrien-20-one is obtained.

The 3β-acyloxy-12-hydroxy- and 3β,12-dihydroxy-5,7,9(11)-pregnatrien-20-one maleic acid and maleic anhydride adducts of this invention are convertible to trienes, namely, 3β-acyloxy and 3β,12-dihydroxy-trien-20-ones, respectively, having double bonds at the 5(6), 7(8) and 9(11) positions and the formula:

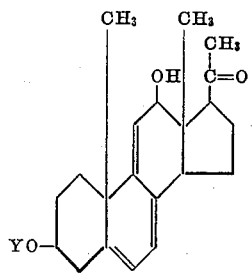

wherein Y has the significance hereinbefore specified. The removal of the maleic acid or maleic anhydride radical is effected by a pyrolysis reaction which consists essentially in heating the maleic acid or maleic anhydride adduct of the 3β-acyloxy-12-hydroxy, or the 3β,12-dihydroxy-5,7,9(11)-pregnatrien-20-one in the presence of an organic amine at a temperature of approximately 100 to approximately 225 degrees centigrade, with or without the presence of an organic solvent, and thereafter isolating the product triene. It is not necessary to isolate the adducts from a reaction mixture in which they are formed in order to effect the removal of the adduct radical in accordance with such pyrolysis processes, since the entire reaction mixture or crude product may be treated. The desired triene can be obtained in a high degree of purity and in excellent yields.

Amines which can be used in this pyrolysis process include: secondary aliphatic amines such as dimethylamine, diethylamine, dipropylamine, dibutylamine, diamylamine, dioctylamine; tertiary aliphatic amines such as trimethylamine, triamylamine, methyldioctylamine, methyldiethylamine; secondary and tertiary cycloaliphatic amines such as N-methylcyclohexylamine, N,N-dimethylcyclohexylamine, N,N-diethylcyclohexylamine; secondary and tertiary heterocyclic amines such as pyrrolidine, N-methylmorpholine, N-ethylpyrrolidine, morpholine, piperidine, N-methylpiperidine, 2-methylpiperidine, 1,2-dimethylpiperidine, 1,2,4-trimethylpiperidine, 2,4,6-trimethylpiperidine, 1-ethyl-2,4,6-trimethylpiperidine; aromatic heterocyclic amines such as pyridine, picoline, lutidine, collidine, quinoline, quinaldine, lepidine, 3-methylquinoline; secondary and tertiary carbocyclic aromatic amines such as N-methylaniline, N-ethylaniline, N-butylaniline, N-benzylaniline, N,N-dimethylaniline, N,N-diethylaniline, N,N-dibutylaniline, N,N-dibenzylaniline, N-methyltoluidine, N,N-diethyltoluidine, N-ethylxylidine, N,N-dimethylxylidine; substituted aliphatic amines such as diethylaminoethanol, dibutylaminoethanol, N-pyrrolidylethanol, N-piperidylethanol; substituted aromatic amines such as ortho-methoxy-N,N-dimethylaniline, para-ethoxy - N,N - diethylaniline, para-chloro-N,N-dimethylaniline, para-bromo - N,N - diethylaniline, para-fluoro-N,N-dibutylaniline, N,N-dimethylmesidine (N,N-dimethyl-2,4,6-trimethylaniline); secondary and tertiary aralkyl amines such as methylbenzylamine, dimethylbenzylamine, propylbenzylamine, diisopropylphenethylamine, diethylphenylisopropylamine; and primary amines such as butylamine, hexylamine, octylamine, cyclohexylamine, aniline, toluidine, xylidine and the like.

The process comprises heating the selected 3β-acyloxy-12-hydroxy or 3β,12-dihydroxy-5,7,9(11)-pregnatrien-20-one maleic acid or maleic anhydride adduct to a temperature between approximately 100 and approximately 225 degrees centigrade, preferably between 175 and 200 degrees centigrade, in the presence of an organic amine, removing excess amine, and recovering the product triene. The time required for the reaction is usually from approximately one to approximately eight hours, depending upon such factors as the particular steroid adduct being treated, the amine employed, and the temperature of reaction. Ordinarily, a reaction period of approximately four hours is entirely satisfactory, although, at lower temperatures, a more extended period may be employed to advantage. The employment of pressure may in some cases be advantageous, although it is in most cases preferred to conduct the pyrolysis reaction at atmospheric pressure. After completion of the reaction, the pure triene product can be recovered in conventional manner, such as by evaporation of solvent in vacuo, redissolving the residue in an organic solvent, e. g., methanol, diluting with water, extracting with ether, washing the solution until neutral, drying, evaporating to dryness, chromatographing over an alumina column, and recrystallizing from an organic solvent, if desired.

Such processes, which are exemplified by the conversion of maleic acid and maleic anhydride adducts of other steriods of this series, are more fully disclosed in our copending application Serial No. 228,134, filed on May 24, 1951, now Patent No. 2,655,516.

Inasmuch as the foregoing specification comprises preferred embodiments of our invention, it is to be understood that alterations and modifications may be made therein in conventional manner and that the invention is limited solely by the scope of the claims appended hereto.

We claim:

1. An adduct of a 12-hydroxy-5,7,9(11)-pregnatrien-20-one having the formula:

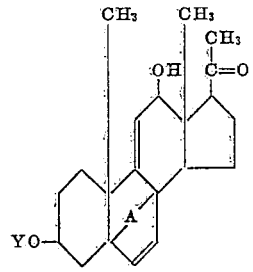

in which Y is a radical of the group consisting of hydrogen and hydrocarbon acyl radicals containing from one to eight carbon atoms, inclusive, and A is the adduct radical of an α,β-unsaturated carbonyl compound of the group consisting of maleic acid, maleic anhydride, and di-lower-alkyl maleates.

2. An adduct of a 3β,12-dihydroxy-5,7,9(11)-pregnatrien-20-one and an α,β-unsaturated carbonyl compound of the group consisting of maleic acid, maleic anhydride, and di-lower-alkyl maleates.

3. The dimethyl maleate adduct of 3β-acetoxy-12-hydroxy-5,7,9(11)-pregnatrien-20-one.

4. The maleic acid adduct of 3β,12-dihydroxy-5,7,9-(11)-pregnatrien-20-one.

5. The dimethyl maleate adduct of 3β,12-dihydroxy-5,7,9(11)-pregnatrien-20-one.

6. The maleic anhydride adduct of 3β,12-dihydroxy-5,7,9(11)-pregnatrien-20-one.

7. The maleic anhydride adduct of 3β-acetoxy-12-hydroxy-5,7,9(11)-pregnatrien-20-one.

8. A process for the production of an adduct of a 12-hydroxy-5,7,9(11) - pregnatrien - 20 - one having the formula:

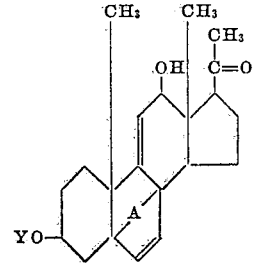

in which Y is a radical of the group consisting of hydrogen and acyl radicals containing from one to eight carbon atoms, inclusive, and A is the adduct radical of an α,β-unsaturated carbonyl compound of the group consisting of maleic acid, maleic anhydride, and di-lower-alkyl maleates, which comprises the reaction of an adduct of a 12-bromo-5,7,9(11)-pregnatrien-20-one having the formula:

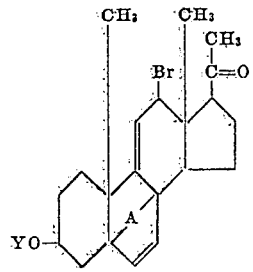

in which A and Y have the significance hereinbefore specified, with a silver salt, and subsequent recovery of the resulting adduct of the 12-hydroxy-5,7,9(11)-pregnatrien-20-one.

9. A process for the production of an adduct of a 3β,12-dihydroxy-5,7,9(11)-pregnatrien-20-one having the formula:

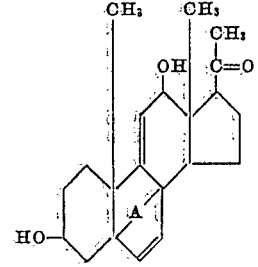

in which A is the adduct radical of an α,β-unsaturated carbonyl compound of the group consisting of maleic acid, maleic anhydride, and di-lower-alkyl maleates, which comprises the reaction with a base of an adduct of a 12-acyloxy-5,7,9(11)-pregnatrien-20-one having the formula:

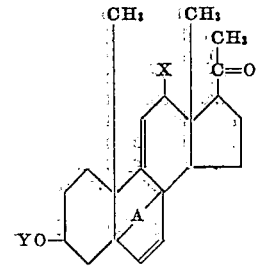

in which X is an acyloxy radical containing from one to eight carbon atoms, inclusive, and Y is a radical of the group consisting of hydrogen and acyl radicals containing from one to eight carbon atoms, inclusive, and A is the adduct radical as specified hereinbefore, and subsequent recovery of the resulting adduct of the 3β,12-dihydroxy-5,7,9(11)-pregnatrien-20-one.

No references cited.